(12) United States Patent
Iwrey et al.

(10) Patent No.: US 11,879,386 B2
(45) Date of Patent: Jan. 23, 2024

(54) MODULAR MULTISTAGE TURBINE SYSTEM FOR GAS TURBINE ENGINES

(71) Applicant: Rolls-Royce North American Technologies Inc., Indianapolis, IN (US)

(72) Inventors: Benjamin M. Iwrey, Indianapolis, IN (US); Mark W. Creason, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 167 days.

(21) Appl. No.: 17/692,932

(22) Filed: Mar. 11, 2022

(65) Prior Publication Data

US 2023/0287834 A1 Sep. 14, 2023

(51) Int. Cl.
*F02C 3/107* (2006.01)
*F04D 19/02* (2006.01)
*F01D 25/00* (2006.01)
*F01D 9/04* (2006.01)
*F02C 3/067* (2006.01)
*F02C 7/36* (2006.01)

(52) U.S. Cl.
CPC ............. *F02C 3/107* (2013.01); *F01D 9/041* (2013.01); *F01D 25/00* (2013.01); *F02C 3/067* (2013.01); *F02C 7/36* (2013.01); *F04D 19/026* (2013.01); *F05D 2230/51* (2013.01)

(58) Field of Classification Search
CPC .. F02C 3/107; F02C 3/067; F02C 7/36; F02C 7/00; F01D 9/041; F01D 25/00; F04D 19/026; F05D 2230/51; F05D 2230/60; F05D 2230/70; F05D 2270/20
See application file for complete search history.

(56) References Cited

U.S. PATENT DOCUMENTS

| | | |
|---|---|---|
| 2,837,270 A | 6/1958 | Chapman |
| 3,775,023 A | 11/1973 | Davis et al. |
| 5,062,766 A | 11/1991 | Miura et al. |
| 6,402,482 B1 | 6/2002 | Lee |
| 7,117,839 B2 | 10/2006 | Horstin |
| 7,752,836 B2 | 7/2010 | Orlando et al. |
| 8,209,952 B2 | 7/2012 | Ress |
| 8,251,639 B2 | 8/2012 | Talan |
| 10,883,424 B2 | 1/2021 | Lefebvre |
| 2003/0131606 A1 | 7/2003 | Loebig et al. |
| 2020/0386407 A1 | 12/2020 | Menheere et al. |

*Primary Examiner* — Lee A Holly
(74) *Attorney, Agent, or Firm* — Barnes & Thornburg LLP

(57) ABSTRACT

A method of assembling a gas turbine engine is disclosed herein. The method comprises providing a set of standard turbine stages. Each turbine stage included in the set of standard turbine stages includes a single turbine rotor having a plurality of blades configured to rotate about an axis and a subset of standard turbine vane rings associated with the single turbine rotor.

20 Claims, 8 Drawing Sheets

MODULAR MULTISTAGE TURBINE SYSTEM FOR GAS TURBINE ENGINES

FIELD OF THE DISCLOSURE

The present disclosure relates generally to gas turbine engines, and more specifically to methods of assembling gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

As new market areas develop, gas turbine engines with a wide range of engine performance capabilities may be designed to meet these new demands. However, current design methods for designing and building gas turbine engines may not keep up with the expanding market. The current methods often include full redesigns of commercial engines, which may be slow and expensive. Therefore, new methods for rapidly designing gas turbine engines with different engine performance capabilities may be beneficial in satisfying the expanding market demands.

SUMMARY

The present disclosure may comprise one or more of the following features and combinations thereof.

A method of assembling a gas turbine engine may include providing an axial compressor. The axial compressor may include a predetermined number of axial compressor stages based on an engine performance capability for the gas turbine engine. The axial compressor may have an exit corrected flow output.

In some embodiments, the method may further include providing a set of standard turbine stages whereby each standard turbine stage includes a single turbine rotor and a subset of standard turbine vane rings associated with the single turbine rotor. The single turbine rotor may have a plurality of turbine blades configured to rotate about an axis. The subset of standard turbine vane rings may include a plurality of turbine vanes. The set of standard turbine stages may range from a first turbine stage to an $M^{th}$ turbine stage where M is a natural number greater than 1. Each of the subset of standard turbine vane rings may range from a first turbine vane ring to a $Z^{th}$ turbine vane ring where Z is a natural number greater than 1 and whereby a throat area of the plurality of turbine vanes of each turbine vane ring included in the subset of standard turbine vane rings gradually increases from the first turbine vane ring to the $Z^{th}$ turbine vane ring.

In some embodiments, the method may further include selecting an initial turbine stage from the set of standard turbine stages based on the exit corrected flow output of the axial compressor. In some embodiments, the method may further include selecting an initial turbine vane ring from the subset of standard turbine vane rings included in the initial turbine stage based on the exit corrected flow output of the axial compressor.

In some embodiments, the method may further include locating the initial turbine vane ring downstream of the axial compressor. In some embodiments, the method may further include locating an initial turbine rotor associated with the initial turbine stage directly downstream of the initial turbine vane ring to provide a turbine for the gas turbine engine.

In some embodiments, the method may further include selecting a second turbine stage from the set of standard turbine stages based on a predetermined power demand of the turbine for the gas turbine engine. The second turbine stage may be any turbine stage from the set of standard turbine stages that is greater in size than the selected initial turbine stage.

In some embodiments, the method may further include selecting a second turbine vane ring from the subset of standard turbine vane rings included in the second turbine stage based on exit conditions of the initial turbine stage. In some embodiments, the method may further include locating the second turbine vane ring directly downstream of the initial turbine stage and locating a second turbine rotor associated with the second turbine stage directly downstream of the second turbine vane ring.

In some embodiments, the second turbine stage selected from the set of standard turbine stages may not be directly sequential to the selected initial turbine stage. In some embodiments, the second turbine stage selected from the set of standard turbine stages may be directly sequential to the selected second turbine stage.

In some embodiments, the exit corrected flow output may be based on at least a predetermined inlet corrected flow of the axial compressor and a predetermined pressure ratio of the axial compressor included in the engine performance capability. The exit corrected flow output may be further based on at least a predetermined efficiency of the axial compressor and a predetermined operating temperature of a combustor included in the gas turbine engine.

In some embodiments, providing the axial compressor may include providing a set of standard axial compressor stages. Each standard axial compressor stages may include a rotor having a plurality of blades configured to rotate about the axis and a stator having a plurality of stator vanes. The set of standard axial compressor stages may range from a first compressor stage to an $N^{th}$ compressor stage where N is a natural number greater than 1 and whereby a radial length of the plurality of blades and a radial length of the stator vanes on each compressor stage included in the standard compressor stages gradually decreases in size from the first compressor stage to the $N^{th}$ compressor stage.

In some embodiments, providing the axial compressor may further include selecting an initial axial compressor stage from the set of standard axial compressor stages for the gas turbine engine based on the predetermined inlet corrected flow. In some embodiments, providing the axial compressor may further include adding any number of sequential axial compressor stages from the set of standard axial compressor stages downstream of the initial axial compressor stage based on the predetermined pressure ratio.

In some embodiments, the method may further include selecting any number of turbine stages from the set of standard turbine stages based on a predetermined power demand of the turbine for the gas turbine engine. In some embodiments, the method may further include selecting one turbine vane ring from each subset of standard turbine vane rings included in each of the turbine stages selected from the set of standard turbine stages based on exit conditions of an upstream turbine stage.

In some embodiments, the method may further include locating each turbine vane ring downstream of the initial turbine stage. In some embodiments, the method may further include locating one turbine rotor associated with each of the turbine stages selected from the set of standard turbine stages downstream and between each of the turbine vane ring.

In some embodiments, a furthest downstream turbine stage included in the number of turbine stages may not be the $M^{th}$ turbine stage. In some embodiments, the exit corrected flow output may be determined by a predetermined inlet corrected flow of the axial compressor and a predetermined pressure ratio of the axial compressor included in the engine performance capability.

According to another aspect of the present disclosure, a method may include providing a first axial compressor including a first predetermined number of axial compressor stages based on an engine performance capability for a first gas turbine engine. The first axial compressor may have a first exit corrected flow output.

In some embodiments, the method may further include providing a set of standard turbine stages whereby each standard turbine stage includes a single turbine rotor having a plurality of turbine blades and a subset of standard turbine vane rings associated with the single turbine rotor and including a plurality of turbine vanes. The set of standard turbine stages may range from a first turbine stage to an $M^{th}$ turbine stage where M is a natural number greater than 1. Each of the subset of standard turbine vane rings may range from a first turbine vane ring to a $Z^{th}$ turbine vane ring where Z is a natural number greater than 1 and whereby a throat area of the plurality of turbine vanes of each turbine vane ring included in the subset of standard turbine vane rings gradually increases from the first turbine vane ring to the $Z^{th}$ turbine vane ring.

In some embodiments, the method may further include selecting an initial turbine stage from the set of standard turbine stages for the first gas turbine engine. The initial turbine stage may be selected from the set of standard turbine based on the first exit corrected flow output of the first axial compressor.

In some embodiments, the method may further include selecting an initial turbine vane ring from the subset of standard turbine vane rings included in the initial turbine stage for the first gas turbine engine. The initial turbine vane ring may be selected from the subset of standard turbine vane rings included in the initial turbine stage based on the first exit corrected flow output of the first axial compressor of the first gas turbine engine.

In some embodiments, the method may further include locating the initial turbine vane ring for the first gas turbine engine downstream of the first axial compressor of the first gas turbine engine. In some embodiments, the method may further include locating an initial turbine rotor associated with the initial turbine stage for the first gas turbine engine directly downstream of the initial turbine vane ring of the first gas turbine engine to provide a turbine for the first gas turbine engine.

In some embodiments, the method may further include providing a second axial compressor including a second predetermined number of axial compressor stages based on an engine performance capability for a second gas turbine engine. The second axial compressor may have a second exit corrected flow output.

In some embodiments, the method may further include selecting an initial turbine stage from the set of standard turbine stages for the second gas turbine engine. The initial turbine stage may be selected from the set of standard turbine stages based on the second exit corrected flow output of the second axial compressor.

In some embodiments, the method may further include selecting an initial turbine vane ring from the subset of standard turbine vane rings included in the initial turbine stage for the second gas turbine engine. The initial turbine vane ring may be selected from the subset of standard turbine vane rings included in the initial turbine stage based on the second exit corrected flow output of the second axial compressor.

In some embodiments, the method may further include locating the initial turbine vane ring for the second gas turbine engine downstream of the second axial compressor of the second gas turbine engine. In some embodiments, the method may further include locating an initial turbine rotor associated with the initial turbine stage for the second gas turbine engine directly downstream of the initial turbine vane ring of the second gas turbine engine to provide a turbine for the second gas turbine engine.

In some embodiments, the method may further include selecting a second turbine stage from the set of standard turbine stages based on a first predetermined power demand of the turbine for the first gas turbine engine. The second turbine stage may be any turbine stage from the set of standard turbine stages that is greater in size than the selected initial turbine stage for the first gas turbine engine.

In some embodiments, the method may further include selecting a second turbine vane ring from the subset of standard turbine vane rings included in the second turbine stage for the first gas turbine engine. The second turbine vane ring may be selected from the subset of standard turbine vane rings included in the second turbine stage based on based on exit conditions of the initial turbine stage of the turbine for the first gas turbine engine.

In some embodiments, the method may further include locating the second turbine vane ring downstream of the initial turbine stage in the first gas turbine engine. In some embodiments, the method may further include locating a second turbine rotor associated with the second turbine stage downstream of the second turbine vane ring in the first gas turbine engine. In some embodiments, the second turbine stage selected from the set of standard turbine stages may not be directly sequential to the selected initial turbine stage for the first gas turbine engine.

In some embodiments, the method may further include selecting any number of turbine stages from the set of standard turbine stages. The number of turbine stages selected from the set of standard turbine stages may be based on the first predetermined power demand of the turbine of the first gas turbine engine.

In some embodiments, the method may further include selecting one turbine vane ring from each subset of standard turbine vane rings included in each of the turbine stages selected from the set of standard turbine stages. The one turbine vane ring may be selected from each subset of standard turbine vane rings based on the exit conditions of an upstream turbine stage in the first gas turbine engine.

In some embodiments, the method may further include locating each turbine vane ring downstream of the initial turbine stage of the first gas turbine engine. In some embodiments, the method may further include locating one turbine rotor associated with each of the turbine stages selected from the set of standard turbine stages downstream and between each of the turbine vane rings added to the first gas turbine engine.

In some embodiments, the method may further include selecting any number of turbine stages from the set of standard turbine stages. The number of turbine stages selected from the set of standard turbine stages may be based on a second predetermined power demand of the turbine for the second gas turbine engine. The second predetermined power demand may be different than the first predetermined power demand of the turbine of the first gas turbine engine.

In some embodiments, the method may further include selecting one turbine vane ring from each subset of standard turbine vane rings included in each of the turbine stages selected from the set of standard turbine stages. The one turbine vane ring may be selected from each subset of standard turbine vane rings based on the exit conditions of an upstream turbine stage in the second gas turbine engine.

In some embodiments, the method may further include locating each turbine vane ring downstream of the initial turbine stage of the second gas turbine engine and locating one turbine rotor associated with each of the turbine stages selected from the set of standard turbine stages downstream and between each of the turbine vane rings added to the second gas turbine engine. In some embodiments, the number of turbine stages for the second gas turbine engine is different from the number of turbine stages for the first gas turbine engine.

In some embodiments, the first exit corrected flow output may be determined by a first predetermined inlet corrected flow of the first axial compressor and a first predetermined pressure ratio of the first axial compressor included in the engine performance capability for the first gas turbine engine. In some embodiments, the second exit corrected flow output may be determined by a second predetermined inlet corrected flow of the second axial compressor and a second predetermined pressure ratio of the second axial compressor included in the engine performance capability for the second gas turbine engine.

According to another aspect of the present disclosure, a method may include selecting an initial turbine stage from a set of standard turbine stages. The initial turbine stage may be selected from the set of standard turbine stages based on an exit corrected flow output of an axial compressor. Each standard turbine stage may include a single turbine rotor having a plurality of turbine blades and a subset of standard turbine vane rings associated with the single turbine rotor.

In some embodiments, the method may further include selecting an initial turbine vane ring from the subset of standard turbine vane rings included in the initial turbine stage. The initial turbine vane ring may be selected from the subset of standard turbine vane rings based on the exit corrected flow output of the axial compressor.

In some embodiments, the method may further include selecting a second turbine stage from the set of standard turbine stages. The second turbine stage may be selected from the set of standard turbine stages based on a predetermined power demand. The second turbine stage may be any turbine stage from the set of standard turbine stages that is greater in size than the selected initial turbine stage.

In some embodiments, the method may further include selecting a second turbine vane ring from the subset of standard turbine vane rings included in the second turbine stage. The second turbine vane ring may be selected from the subset of standard turbine vane rings included in the second turbine stage based on exit conditions of the initial turbine stage.

In some embodiments, the method may further include locating the initial turbine vane ring downstream of the axial compressor, locating an initial turbine rotor associated with the initial turbine stage directly downstream of the initial turbine vane ring, locating the second turbine vane ring directly downstream of the initial turbine rotor, and locating a second turbine rotor associated with the second turbine stage directly downstream of the second turbine vane ring to provide a turbine for a gas turbine engine. The second turbine stage selected from the set of standard turbine stages may not be directly sequential to the selected initial turbine stage.

These and other features of the present disclosure will become more apparent from the following description of the illustrative embodiments.

DETAILED DESCRIPTION OF THE DRAWINGS

Figure 1:
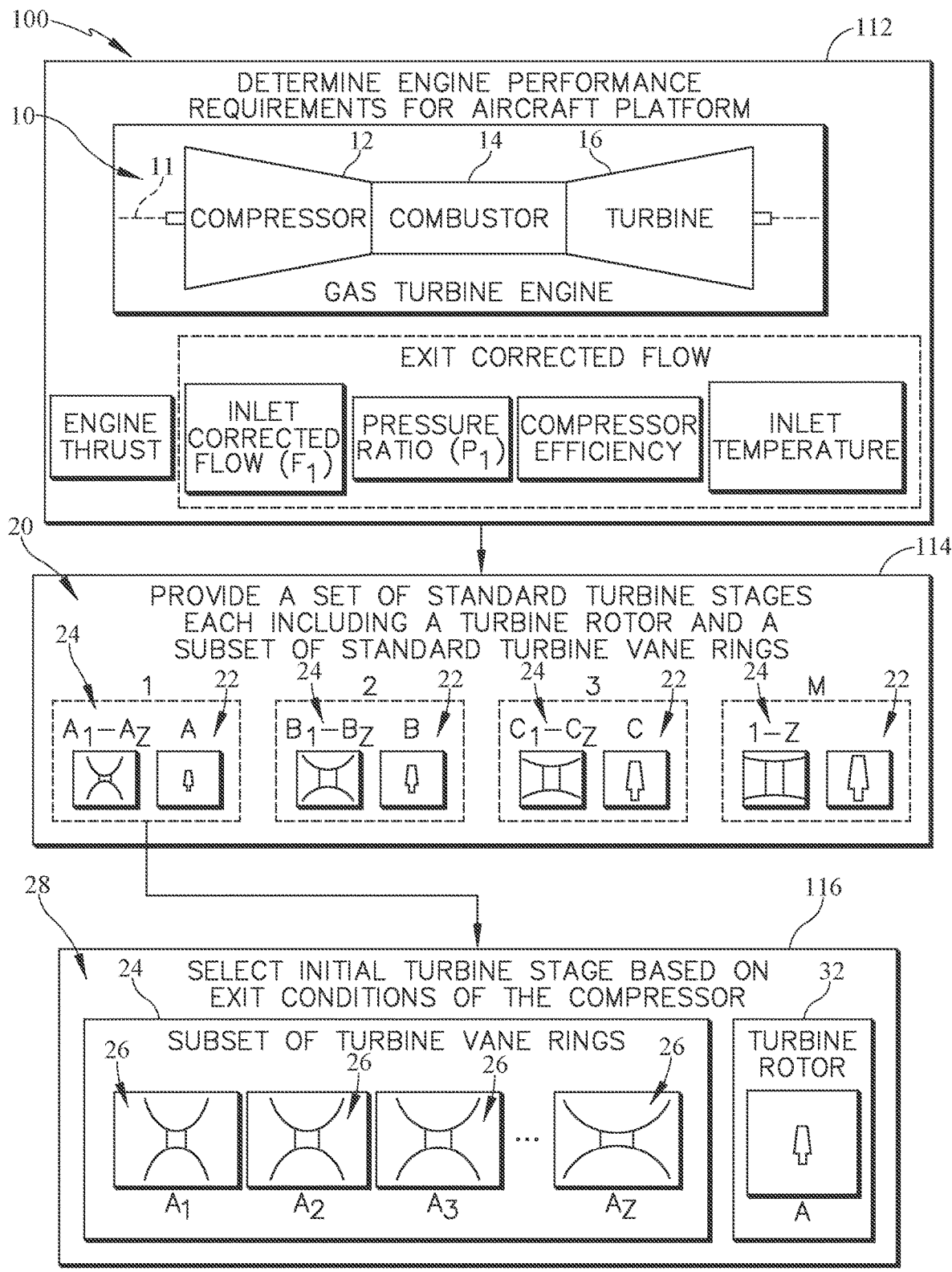
FIG. 1 is a diagrammatic view of a method of assembling a gas turbine engine showing the method comprises assembling a turbine for the gas turbine engine by selecting an initial turbine stage from a set of standard turbine stages based on predetermined engine performance capabilities to provide a turbine for the gas turbine engine, and further showing each standard turbine stage includes a single turbine rotor having a plurality of turbine blades configured to rotate about an axis and a subset of standard turbine vane rings associated with the single turbine rotor and including a plurality of turbine vanes.

For the purposes of promoting an understanding of the principles of the disclosure, reference will now be made to a number of illustrative embodiments illustrated in the drawings and specific language will be used to describe the same.

A method 100 of assembling a gas turbine engine 10 is shown in FIGS. 1-6. The gas turbine engine 10 is designed to meet desired engine performance capabilities by assembling a turbine 16 for the gas turbine engine 10 from a set of standard turbine stages 20. Each standard turbine stage included in the set of standard turbine stages 20 includes a single turbine rotor 22 configured to rotate about an axis 11 of the gas turbine engine 10 and a subset of standard turbine vane rings 24 each including a plurality of turbine vanes 26 as shown in FIG. 1.

The set of standard turbine stages 20 ranges from a first turbine stage to an $M^{th}$ turbine stage as shown in FIG. 1. For the $M^{th}$ turbine stage, M is a natural number greater than 1. Each of the subset of standard turbine vane rings 24 ranges from a first turbine vane ring to a $Z^{th}$ turbine vane ring as shown in FIG. 1. For the $Z^{th}$ turbine vane ring, Z is a natural number greater than 1. From the first standard turbine vane ring to the $Z^{th}$ turbine vane ring, the throat area of the plurality of turbine vanes 26 of each turbine vane ring included in the subset of standard turbine vane rings 24 gradually increases from the first turbine vane ring to the $Z^{th}$ turbine vane ring.

For each turbine vane ring included in the subset of standard turbine vane rings 24, each standard turbine vane ring is set in size and dimension and does not change. Similarly, each turbine rotor associated with each turbine stage included in the set of standard turbine stages 20 is set in size and dimension and does not change.

The set of standard turbine stages 20 are configurable to cover a wide range of engine performance capabilities and can be assembled differently based on the desired engine performance capability of the gas turbine engine 10. To begin assembling the gas turbine engine 10, the desired engine performance capabilities for the gas turbine engine 10 is determined as suggested by box 112 in FIG. 1.

Based on the engine performance capabilities for the gas turbine engine 10, such as an exit corrected flow output of an axial compressor 12 included in the gas turbine engine 10, an initial turbine stage 28 is selected from the set of standard turbine stages 20 as suggested by box 116 in FIG. 1. The initial turbine stage 28 includes the associated turbine rotor 22 and the associated subset of standard turbine vanes rings 24 as shown in FIG. 1. The initial turbine stage 28 may be any one of the standard size turbine stages, for example, it can be the $1^{st}$ standard sized stage, $2^{nd}$, etc.

Figure 2:
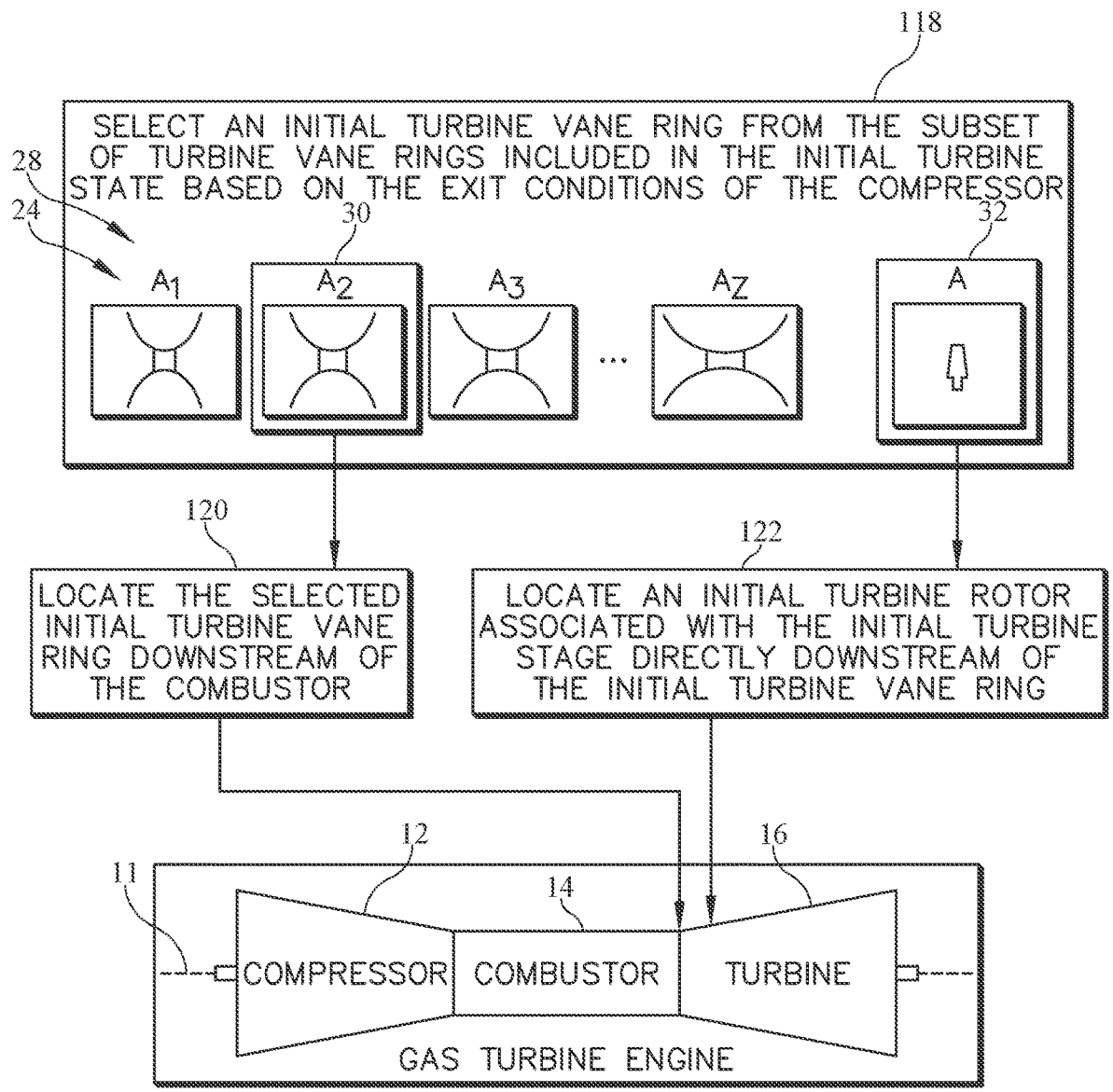
FIG. 2 is a diagrammatic view of a the method of assembling the gas turbine engine of FIG. 1 showing the method further includes selecting an initial turbine vane ring form the subset of turbine vanes rings included in the initial turbine stage based on the exit conditions of a compressor included in the gas turbine engine and assembling the initial turbine vane ring and the initial turbine rotor downstream of the compressor and the combustor.

From the subset of standard turbine vanes rings 24 associated with the initial turbine stage 28, an initial turbine vane ring 30 is selected from the subset of standard turbine vane rings 24 based on the exit corrected flow output of the axial compressor 12 as suggested by box 118 in FIG. 2. The initial turbine vane ring 30 is located downstream of the compressor 12 and combustor 14 as suggested by box 120 and the initial turbine rotor 22 associated with the initial turbine stage 28 is located directly downstream of the initial turbine vane ring 30 as suggested by box 122 in FIG. 2. The initial turbine vane ring 30 is located downstream of the compressor 12/combustor 14 and the initial turbine rotor 22 is located directly downstream of the initial turbine vane ring 30 to provide a turbine 16 for the gas turbine engine 10.

Figure 3:
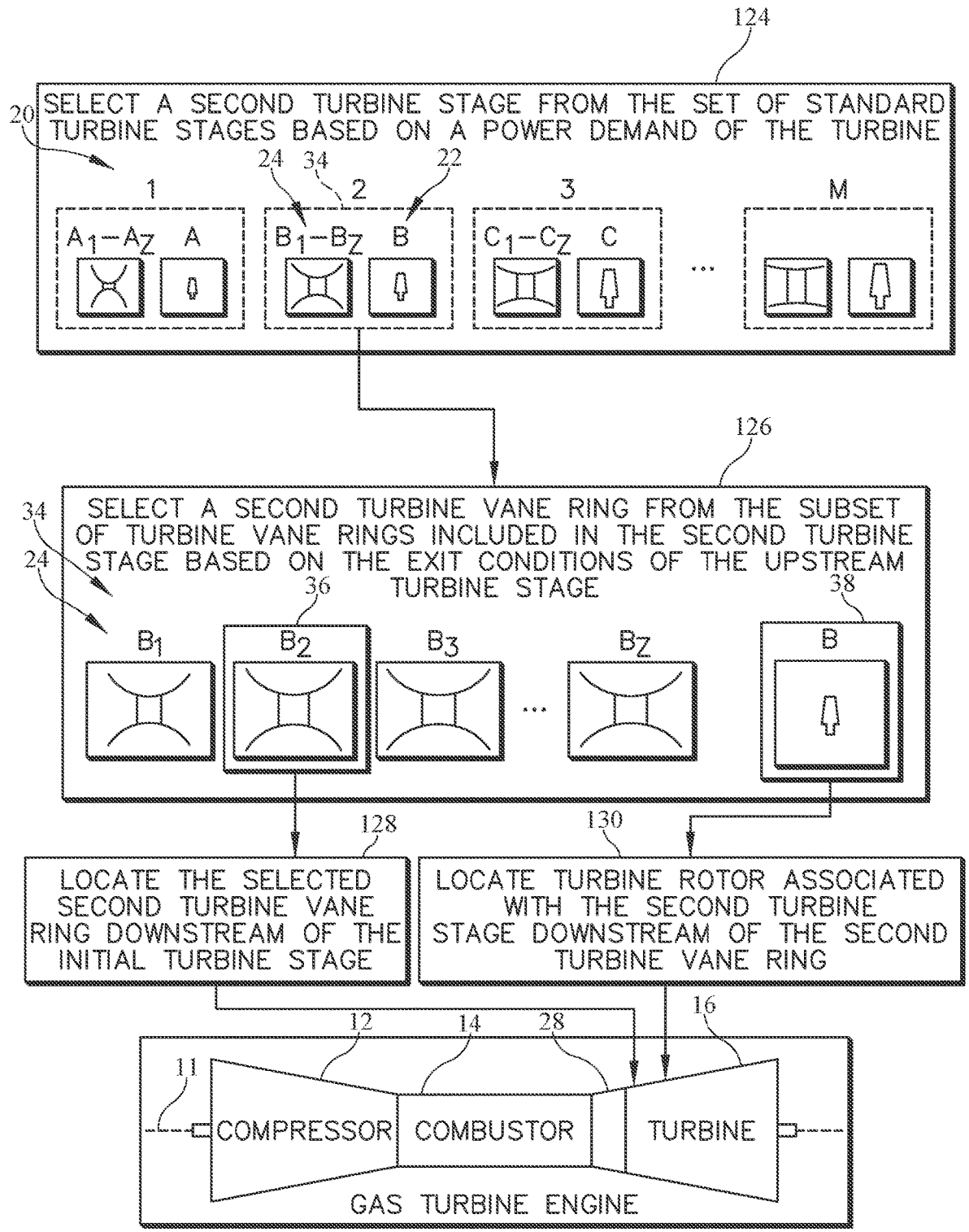
FIG. 3 is a diagrammatic view of the method of assembling the gas turbine engine of FIG. 2 showing the method further includes selecting a second turbine stage from the set of standard turbine stages based on predetermined power demand of the turbine for the gas turbine engine and selecting a second turbine vane ring form the subset of turbine vanes rings included in the second turbine stage to be assembled downstream of the initial turbine stage.

The next turbine stages are selected based on the power demand of the turbine 16 for the gas turbine engine 10 as suggested by box 124 in FIG. 3. The number of turbine stages selected from the set of standard turbine stages 20 is based on a predetermined power demand of the turbine 16 for the gas turbine engine 10. For each turbine stage, one turbine vane ring is selected from each subset of standard turbine vane rings 24 included in each of the turbine stages 20 based on the exit flow conditions of the upstream turbine stage. Each turbine vane ring is located downstream of the initial turbine stage 28 and the turbine rotor associated with each of the turbine stages selected is located downstream and between each of the turbine vane ring. In this way, many engines each with differing capabilities can be designed and assembled using different combinations of the turbine vane rings 24 and turbine rotors 22 included in each standard turbine stage 20.

The subsequent turbine stages after the initial turbine stage 28 may be sequential to the selected initial turbine stage 28 in some embodiments. In other words, the next turbine stage selected from the set of standard turbine stages 20 may be the next sequential turbine stage from the set of standard turbine stages 20 like as shown in FIG. 3.

Figure 4:
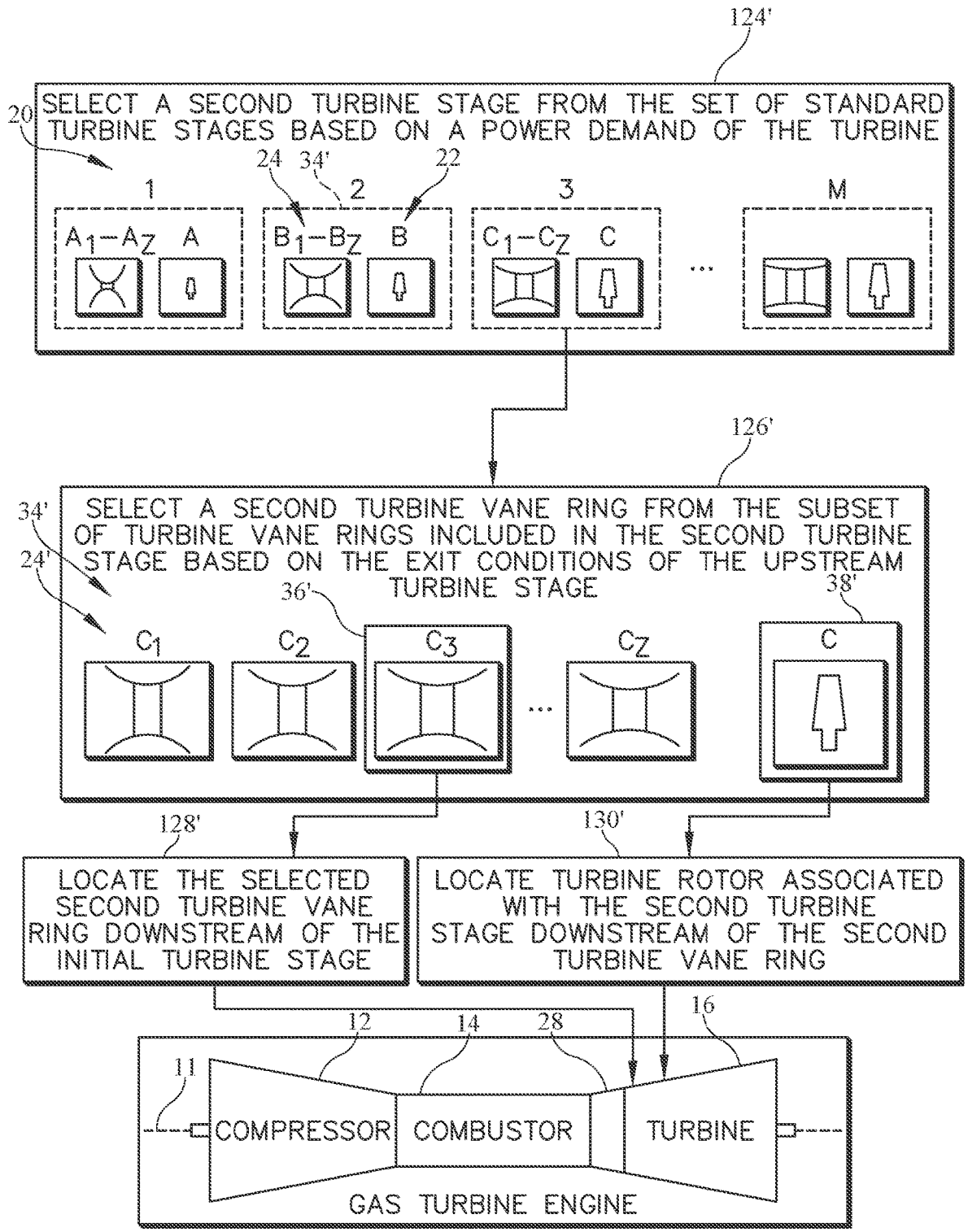
FIG. 4 is a diagrammatic view of the method of assembling the gas turbine engine of FIG. 2 showing the second turbine stage does not have to be sequential to the selected initial turbine stage and a different second turbine stage may be selected from the set of standard turbine stages based on predetermined power demand of the turbine for the gas turbine engine.

In other embodiments, the subsequent turbine stages after the initial turbine stage 28 are not directly sequential to the selected initial turbine stage 28. In other words, the next turbine stage selected from the set of standard turbine stages 20 does not have to be the sequential turbine stage from the set of standard turbine stages 20 like as shown in FIG. 4. Any combination of turbine stages from the set of standard turbine stages 20 may be provided so as to provide the predetermined power demand of the turbine 16 for the gas turbine engine 10.

Figure 6:
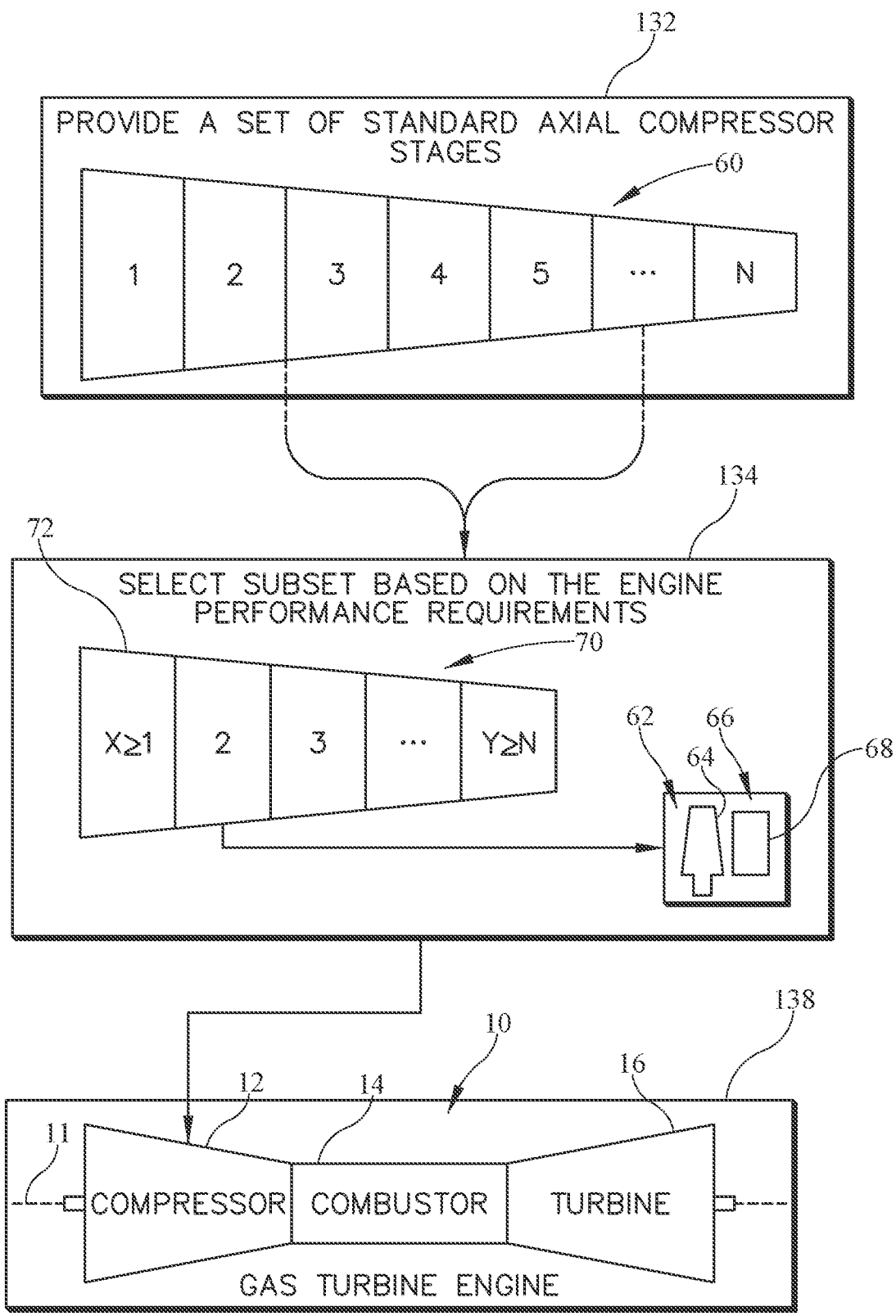
FIG. 6 is a diagrammatic view of the method of assembling the gas turbine engine of FIG. 1 showing the method further includes assembling the compressor for the gas turbine engine by selecting a subset of axial compressor stages from a set of standard axial compressor stages based on predetermined engine performance capabilities to provide the compressor for the gas turbine engine.

The method 100 further includes providing an axial compressor 12 based on the determined engine performance capability for the gas turbine engine 10 as shown in FIG. 6. The axial compressor 12 may provide with a predetermined number of axial compressor stages in some embodiments.

In other embodiments, the axial compressor 12 is provided by selecting the predetermined number of axial compressor stages from a set of standard axial compressor stages 60 based on the engine performance capability for the gas turbine engine 10 as shown in FIG. 6. In this way, the axial compressor 12 of the gas turbine engine 10 may be designed to meet desired engine performance capabilities by assembling the axial compressor 12 for the gas turbine engine 10 from the set of standard axial compressor stages 20.

Figure 9:
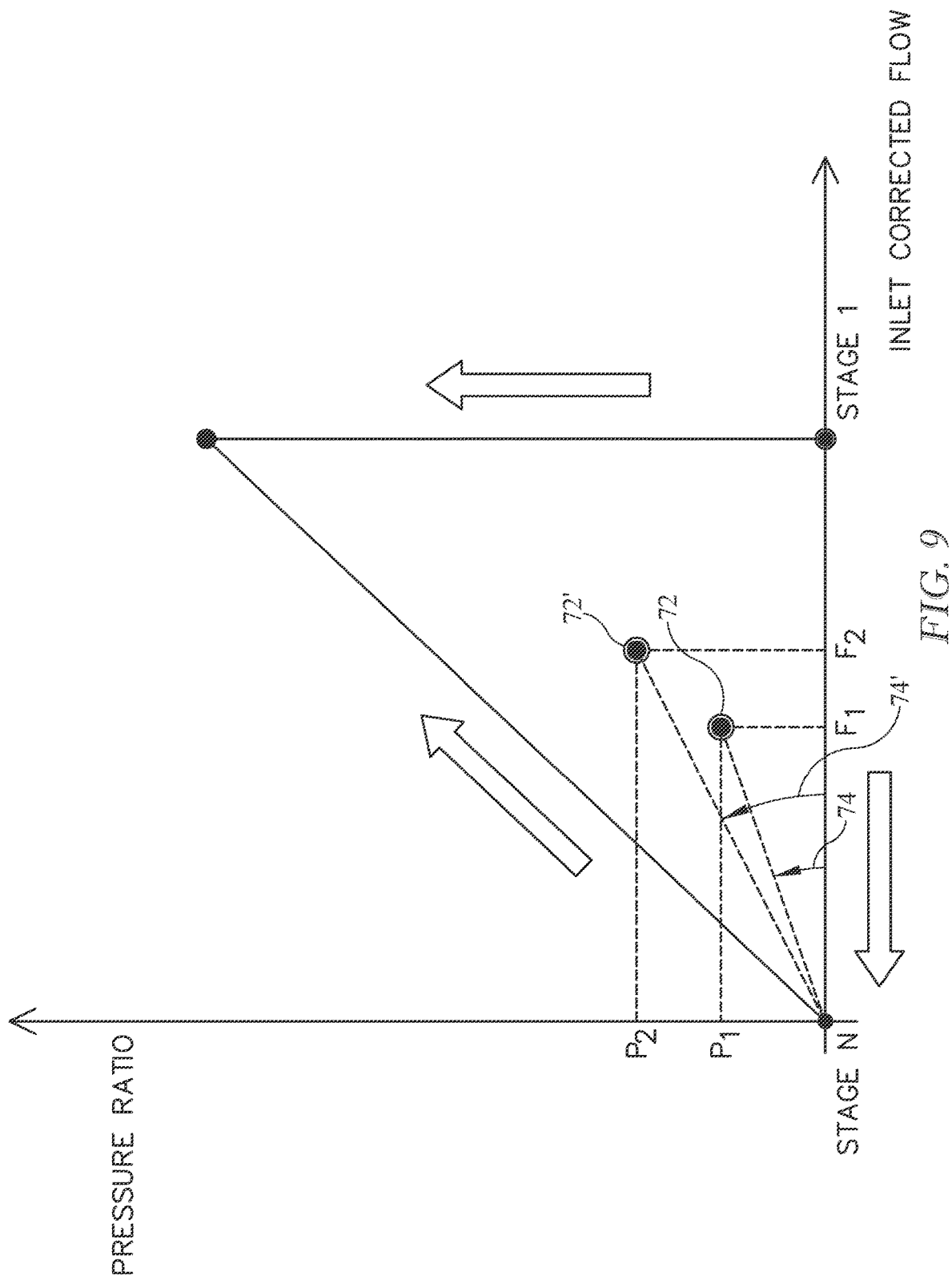
FIG. 9 is a diagrammatic graph associated with the step of selecting the subset of axial compressor stages from the set of standard axial compressor stages in FIG. 6 showing an initial axial compressor stage is selected from the set of standard axial compressor stages for the gas turbine engine based on a desired predetermined inlet corrected flow of the engine and a number of sequential axial compressor stages from the set of standard axial compressor stages is added downstream of the initial axial compressor stage based on a desired predetermined pressure ratio of the engine.

The axial compressor 12 has an exit corrected flow output that is used to select the initial turbine stage 30, 30' from the set of standard turbine stages 20. The exit corrected flow output is based on a predetermined inlet corrected flow $F_1$ of the axial compressor 12, a predetermined pressure ratio $P_1$ of the axial compressor 12, a predetermined efficiency of the axial compressor 12, and/or a predetermined operating temperature of a combustor 14 included in the gas turbine engine 10. In the illustrative embodiment, the exit corrected flow output is based on the predetermined inlet corrected flow $F_1$ of the axial compressor 12 and a predetermined pressure ratio $P_1$ of the axial compressor 12 as shown in FIG. 9.

The method 100 includes providing the set of standard axial compressor stages 60 as suggested by box 132 in FIG. 6. Each standard axial compressor stage included in the set of standard axial compressor stages 60 includes a rotor 62 having a plurality of blades 64 configured to rotate about the axis 11 of the gas turbine engine 10 and a stator 66 having a plurality of stator vanes 68 as shown in FIG. 6.

The set of standard axial compressor stages 60 ranges from a first compressor stage to an $N^{th}$ compressor stage as shown in FIG. 6. For the $N^{th}$ compressor stage, N is a natural number greater than 1. From the first compressor stage to the $N^{th}$ compressor stage, a radial length of the plurality of blades and a radial length of the stator vanes on each compressor stage gradually decreases in size as suggested in FIG. 6. The set of standard axial compressor stages 60 are set in size for each stage and do not change.

The set of standard axial compressor stages 60 covers a wide range of engine performance capabilities, such as cycle-level core compressor capabilities of a wide range of engine rated thrust. Based on the engine performance capabilities for the gas turbine engine 10, a subset of the axial compressor stages 70 from the set of standard axial compressor stages 60 is selected as suggested by box 134 in FIG. 6. The selected subset of axial compressor stages 70 from the set of standard axial compressor stages 60 provides the axial compressor 12 for the gas turbine engine 10 which sets the exit corrected flow output.

In the illustrative embodiment, the method includes selecting an initial axial compressor stage 72 from the set of standard axial compressor stages 60 for the gas turbine engine 10 based on the predetermined inlet corrected flow $F_1$. Then, the method includes adding any number of sequential axial compressor stages from the set of standard axial compressor stages 60 downstream of the initial axial compressor stage 72 based on the predetermined pressure ratio $P_1$ as suggested by box 136 in FIG. 6.

As one example, the set of standard axial compressor stages 60 includes 14 stages and an axial compressor is assembled using stages 3-8 of the standard axial compressor stages 60 to achieve the desired engine performance characteristics. In another example, stages 1-10 are used. In another example, stages 1-14 are used. In another example, stages 2-14 are used. As can be seen with these examples, any sequential subset of stages from the set of standard axial compressor stages 20 may be used.

The graph shown in FIG. 9 shows the method of selecting the initial axial compressor stage 72 and the number of sequential axial compressor stages. The x-coordinate on the graph shown in FIG. 9 corresponds to the initial axial compressor stage 72. The angle 74 plotted line connecting the plotted coordinate 72 to the origin corresponds to the number of axial compressor stages to couple downstream of the initial axial compressor stage 72.

Turning again to the turbine 16 for the gas turbine engine 10, the method 100 includes providing the set of standard turbine stages 20 as suggested by box 114 in FIG. 1. Once, the axial compressor 12 is provided, or rather the exit corrected flow output is known, the method 100 includes selecting the initial turbine stage 28, 28' from the set of standard turbine stages 20 based on the exit corrected flow output of the axial compressor 12 as suggested by box 116, 116' in FIGS. 1 and 5. From the subset of standard turbine vane rings 24, 24' included in the initial turbine stage 28, 28', the initial turbine vane ring 30, 30' is selected based on the exit corrected flow output of the axial compressor 12 as suggested by box 118, 118' in FIGS. 2 and 5.

In the illustrative embodiment, the initial turbine stage 28 selected form the set of standard turbine stages 20 is the first standard turbine stage included in the set of standard turbine stages 20 as shown in FIG. 1. The initial turbine vane ring 30 may be the first turbine vane ring included in the subset of standard turbine vane rings 24. In the illustrative embodiment, the initial turbine vane ring 30 is not the first turbine vane ring included in the subset of standard turbine vane rings 24. The selected initial turbine vane ring depends on the exit corrected flow output of the axial compressor 12.

Figure 5:
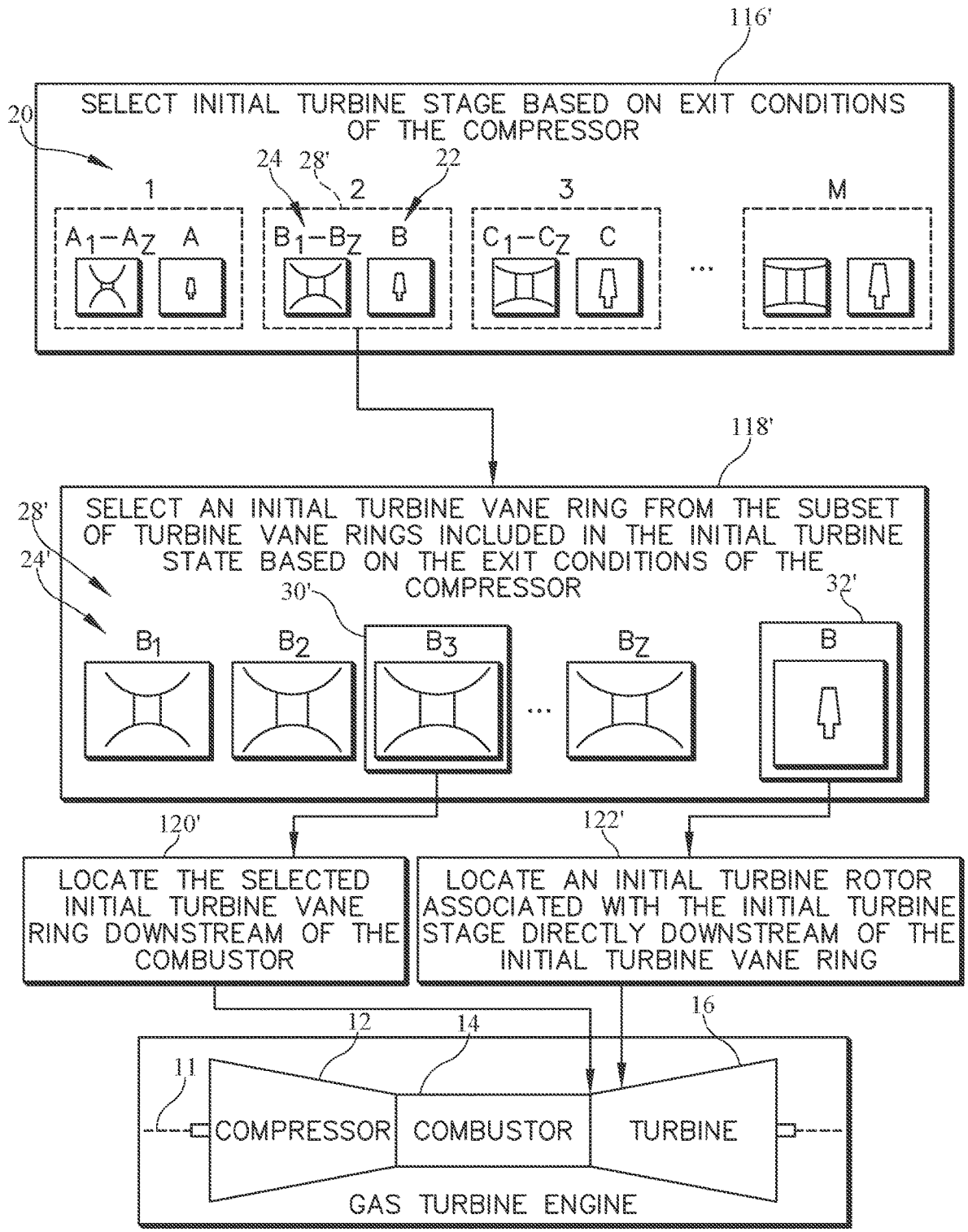
FIG. 5 is a diagrammatic view of the method of assembling the gas turbine engine showing a different initial turbine stage may be selected from the set of standard turbine stages based on predetermined engine performance capabilities of a turbine for the gas turbine engine.

In other embodiments, the initial turbine stage 28' selected from the standard turbine stage 28 is any other standard turbine stage included in the set of standard turbine stages 20 other than the first standard turbine stage as shown in FIG. 5. In the illustrative embodiment, the initial turbine stage 28' is not the first turbine vane ring included in the set of standard turbine stages 20 as shown in FIG. 5.

Figure 7:
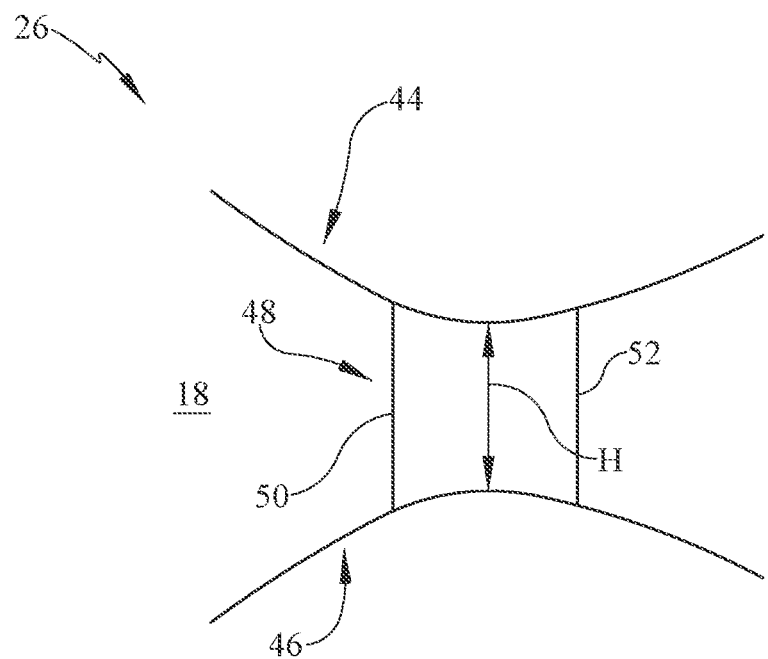
FIG. 7 is an elevation view of a turbine vane included in one of the turbine vane rings showing the turbine vane includes an outer platform, an inner platform spaced apart radially from the outer platform to define a gas path boundary, and an airfoil that extends radially between the outer platform and the inner platform to define a radial height of the turbine vane.
Figure 8:
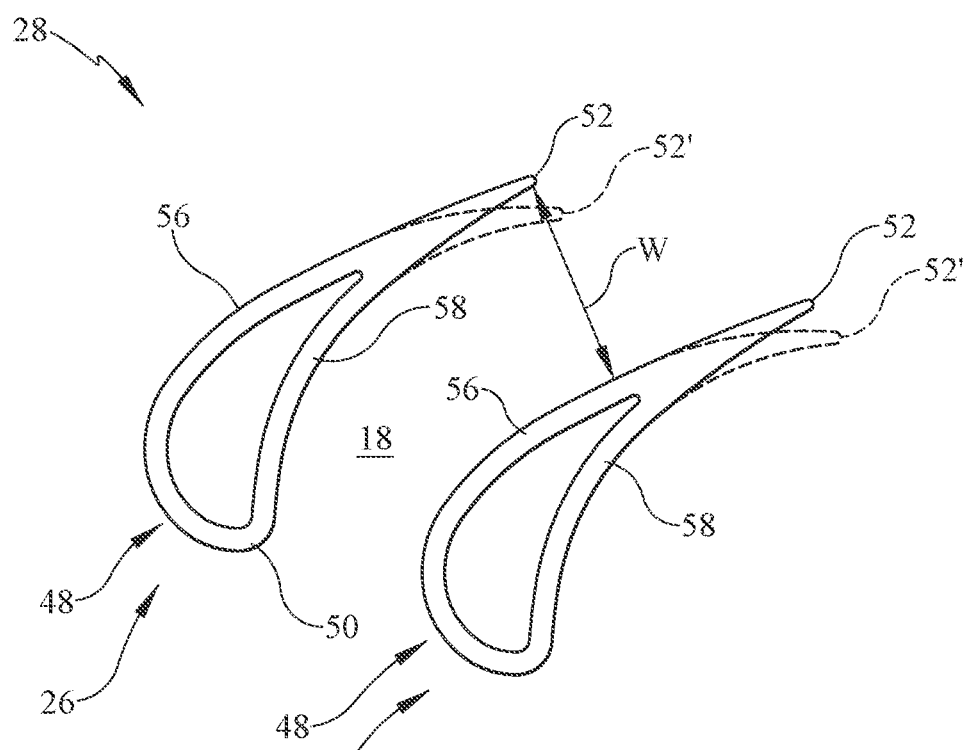
FIG. 8 is a cross section of the adjacent turbine vanes including in one of the turbine vane rings showing each airfoil has a leading edge, a trailing edge spaced apart axially from the leading edge, a pressure side, and a suction side that extend between and interconnect the leading and trailing edges, and further showing the distance between adjacent turbine vanes defines a throat width W of the turbine vane ring.

Each standard turbine vane ring included in each subset of standard turbine vane rings 24 includes a plurality of turbine vanes 26 as shown in FIGS. 7 and 8. Each turbine vane 26 includes an outer platform 44, an inner platform 46, and an airfoil 48 that extends radially between the outer platform 44 and the inner platform 46 as shown in FIGS. 7 and 8. The inner platform 46 is spaced apart radially from the outer platform 44 to define a gas path boundary 18 of the gas turbine engine 10 therebetween. The distance between the inner platform and the outer platform defines the radial height H of the vane 26 as shown in FIG. 7.

Each airfoil 48 has a leading edge 50, a trailing edge 52, a pressure side 54, and a suction side 56 as shown in FIGS. 7 and 8. The trailing edge 52 is spaced apart axially from the leading edge 50. The pressure and suction sides 54, 56 extend between and interconnect the leading and trailing edges 50, 52. The distance between adjacent turbine vanes 26 defines the throat width W as shown in FIG. 8.

In the illustrative embodiment, the throat area of the turbine vanes 26 is defined by the radial height H of the vane 26 and the throat width W. The throat area of the plurality of turbine vanes 26 of each turbine vane ring included in the subset of standard turbine vane rings 24 gradually increases from the first turbine vane ring to the $Z^{th}$ turbine vane ring.

In some embodiments, the amount of flow turning produced by the vanes 26 may be varied from the first turbine vane ring to the $Z^{th}$ turbine vane ring as suggested in FIG. 8. In some embodiments, the position of the trailing edge 52' of each vane 26 may be different from the first turbine vane ring to the $Z^{th}$ turbine vane ring. However, each standard turbine vane ring is set in size and dimension and does not change.

Once the initial turbine vane ring 30 is selected, the method 100 includes locating the initial turbine vane ring 30, 30' downstream of the axial compressor 12 as suggested by box 120, 120' in FIGS. 2 and 5. Additionally, an initial turbine rotor 32, 32' associated with the initial turbine stage 28, 28' is located directly downstream of the initial turbine vane ring 30, 30' as suggested by box 122, 122' in FIGS. 2 and 5.

The initial turbine rotor 32, 32' associated with the initial turbine stage 28, 28' is the same regardless of the initial turbine vane ring 30, 30' that is selected from the subset of standard turbine vane rings 24, 24'. For example, in FIG. 2, the initial turbine stage 28 is the first standard turbine stage included in the set of standard turbine stages 20 and has an associated turbine rotor 32. Regardless of which standard turbine vane ring is selected, the turbine rotor 32 associated with the first standard turbine stage is chosen and located downstream of the initial turbine vane ring 30.

In FIG. 5, because a different initial turbine vane ring 30' is selected based on the exit corrected flow output of the axial compressor 12, the turbine rotor 32' will also be different. Instead, the turbine rotor 32' associated with the different standard turbine stage 28' selected from the set of standard turbine stages 20 is chosen and located downstream of the initial turbine vane ring 30' as shown in FIG. 5.

The method 100 continues with assembling the remaining turbine stages based on the power demand of the turbine for the gas turbine engine as suggested in FIGS. 3 and 4. The number of turbine stages to be assembled depends on the predetermined power demand of the gas turbine engine 10. The method 100 includes selecting any number of turbine stages from the set of standard turbine stages 20 based on the predetermined power demand of the turbine 16 for the gas turbine engine 10. In the illustrative embodiment, a furthest downstream turbine stage included in the number of turbine stages is not the $M^{th}$ turbine stage.

Then, one turbine vane ring from each subset of standard turbine vane rings 24 included in each of the turbine stages selected from the set of standard turbine stages 20 is selected based on exit conditions of the upstream turbine stage, such as the temperature, pressure, and/or velocity of the outlet flow from the upstream turbine stage. So for each subsequent turbine vane ring, the exit conditions for the upstream turbine stage determines which turbine vane ring is selected. Each turbine vane ring is located downstream of the initial turbine stage 28 and the turbine rotor associated with each of the turbine stages selected from the set of standard turbine stages 20 is located downstream and between each of the turbine vane rings.

In the illustrative embodiment, the method 100 includes selecting the a second turbine stage 34, 34' from the set of standard turbine stages 20 based on the predetermined power demand of the turbine 16 for the gas turbine engine 10 as suggested by box 124, 124' in FIGS. 3 and 4. The second turbine stage 34, 34' may be any turbine stage from the set of standard turbine stages 20 that is greater in size than the selected initial turbine stage 32.

In some embodiments, the second turbine stage 34, 34' may be directly sequential to the selected initial turbine stage 28, 28'. For example, if the initial turbine stage 28 is the first standard turbine stage of the set of standard turbine stages 20, the second turbine stage 34 is the next sequential turbine stage as shown in FIG. 3. Alternatively, if the initial turbine stage 28' is a different stage other than the first standard turbine stage, the second turbine stage 34' is the next sequential turbine stage as shown in FIG. 4.

In other embodiments, the second turbine stage 34' is not directly sequential to the selected initial turbine stage 28 as shown in FIG. 4. For example, if the initial turbine stage 28 is the first standard turbine stage of the set of standard turbine stages 20, the second turbine stage 34' is not directly sequential to the selected initial turbine stage 28.

Once the second turbine stage 34, 34' is selected, the method 100 includes selecting a second turbine vane ring 36, 36' from the subset of standard turbine vane rings 24, 24' included in the second turbine stage 34 based on the exit conditions of the upstream turbine stage, i.e. the initial turbine stage 28, 28' as suggested by box 126, 126' in FIGS. 3 and 4. The second turbine vane rings 36, 36' is then located directly downstream of the initial turbine stage 28, 28' as suggested by box 128, 128' in FIGS. 3 and 4. Next, the second turbine rotor 38, 38' associated with the second turbine stage 34, 34' is located directly downstream of the second turbine vane ring 36, 36' as suggested by box 130, 130' in FIGS. 3 and 4.

These steps are repeated for the remaining turbine stages to be included in the turbine 16 of the gas turbine engine 10. The fully assembled gas turbine engine 10 has the desired engine performance capability. The method 100 may then be repeated to provide another or second gas turbine engine 10 with the same or a different engine performance capability.

The method 100 includes determining an engine performance capability for a first gas turbine engine 10 and providing a first axial compressor 12 based on the engine performance capability for the first gas turbine engine 10. The first axial compressor 12 includes a first predetermined number of axial compressor stages.

The first axial compressor 12 has a first exit corrected flow output. The first exit corrected flow output is based on a first predetermined inlet corrected flow $F_1$ of the first axial compressor 12 and a first predetermined pressure ratio $P_1$ of the first axial compressor 12 included in the engine performance capability for the first gas turbine engine 10. In the illustrative embodiment, the first exit corrected flow output is based on a first predetermined inlet corrected flow $F_1$ of the first axial compressor 12, a first predetermined pressure ratio $P_1$ of the first axial compressor 12, and a temperature ratio included in the engine performance capability for the first gas turbine engine 10.

In some embodiments, the combustor temperature ratio and pressure loss may also be factors that contribute to the first exit corrected flow output. In some embodiments, the first axial compressor 12 may be assembled from the set of standard axial compressor stages 60 as shown in FIG. 6.

The method 100 continues by selecting the initial turbine stage 28 from the set of standard turbine stages 20 for the first gas turbine engine 10 based on the first exit corrected flow output of the first axial compressor 12. The initial turbine vane ring 30 is then selected from the subset of standard turbine vane rings 24 included in the initial turbine stage 28 based on the first exit corrected flow output of the first axial compressor 12 of the first gas turbine engine 10. The initial turbine vane ring 30 is then located downstream of the first axial compressor 12 of the first gas turbine engine 10 and the initial turbine rotor 32 associated with the initial turbine stage 28 for the first gas turbine engine 10 is located directly downstream of the initial turbine vane ring 30 to provide the turbine 16 for the first gas turbine engine 10.

To assemble a second gas turbine engine, the engine performance capability for the second gas turbine engine is determined. A second axial compressor is then provided based on the engine performance capability for a second gas turbine engine. The engine performance capability for the second gas turbine engine is different from the engine performance capability for the first gas turbine engine 10.

The engine performance capability for the second gas turbine engine includes a second predetermined inlet corrected flow $F_2$ and a second predetermined pressure ratio $P_2$. The second predetermined inlet corrected flow $F_2$ and the second predetermined pressure ratio $P_2$ are different from the first predetermined inlet corrected flow $F_1$ and the first predetermined pressure ratio $P_1$ for the first gas turbine engine 10 as shown in FIG. 9.

The second axial compressor includes a second predetermined number of axial compressor stages. Similar to the first axial compressor 12, the second axial compressor may be assembled from the set of standard axial compressor stages 60 as shown in FIG. 6.

The second axial compressor has a second exit corrected flow output that is different from the first exit corrected flow of the first axial compressor 12. The method 100 continues by selecting an initial turbine stage 28' from the set of standard turbine stages 20 for the second gas turbine engine based on the second exit corrected flow output of the second axial compressor. The initial turbine vane ring 30' is then selected from the subset of standard turbine vane rings 24' included in the initial turbine stage 28' for the second gas turbine engine based on the second exit corrected flow output of the second axial compressor.

The initial turbine vane ring 30' is then located downstream of the second axial compressor of the second gas turbine engine. Next, an initial turbine rotor 32' associated with the initial turbine stage 30' for the second gas turbine engine is located directly downstream of the initial turbine vane ring 30' to provide a turbine for the second gas turbine engine.

The method 100 continues by selecting a second turbine stage 34 from the set of standard turbine stages 20 based on a first predetermined power demand of the turbine 16 for the first gas turbine engine 10. The selected second turbine stage 34 is any turbine stage from the set of standard turbine stages 20 that is greater in size than the selected initial turbine stage 28 for the first gas turbine engine 10.

The second turbine vane ring 36 is selected from the subset of standard turbine vane rings 24 included in the second turbine stage 28 for the first gas turbine engine 10 based on the exit conditions of the selected initial turbine stage 28 for the first gas turbine engine 10. The second turbine vane ring 36 is located downstream of the initial turbine stage 28 in the first gas turbine engine 10 and the second turbine rotor 38 associated with the second turbine stage 34 is located downstream of the second turbine vane ring 36 in the first gas turbine engine 10.

For the turbine of the second gas turbine engine, selecting a second turbine stage 34' from the set of standard turbine stages 20 based on a second predetermined power demand of the turbine for the second gas turbine engine. The selected second turbine stage 34' is any turbine stage from the set of standard turbine stages 20 that is greater in size than the selected initial turbine stage 28' for the second gas turbine engine.

The second turbine vane ring 36' is selected from the subset of standard turbine vane rings 24' included in the second turbine stage 28' for the second gas turbine engine based on the exit conditions of the selected initial turbine stage 28' for the second gas turbine engine. The second turbine vane ring 36' is located downstream of the initial turbine stage 28' in the second gas turbine engine and the second turbine rotor 38' associated with the second turbine stage 34' is located downstream of the second turbine vane ring 36' in the second gas turbine engine 10.

The method of assembling the gas turbine engine 10 is similar to that disclosed in U.S. application Ser. No. 17/390,846, titled "MODULAR MULTISTAGE COMPRESSOR SYSTEM FOR GAS TURBINE ENGINE," filed Jul. 28, 2021, which is hereby incorporated herein by reference in its entirety for its disclosure relative to method of assembling a gas turbine engine.

In some embodiments, the method 100 may continue by assembling the combustor 14 for the gas turbine engine 10. The method 100 includes sizing a combustion chamber of the combustor 14 based on the axial compressor 12. In some embodiments, the combustor may be sized based on the first axial compressor stage included in the subset of standard axial compressor stages 70. Once the combustion chamber is sized accordingly, the combustor may be installed in the gas turbine engine 10 axially downstream of the axial compressor 12. The turbine 16 does not affect the size of the combustor 14 and vice versa.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method comprising:
   selecting an initial turbine stage from a set of standard turbine stages based on an exit corrected flow output of an axial compressor, wherein each standard turbine stage includes a single turbine rotor having a plurality of turbine blades and a subset of standard turbine vane rings associated with the single turbine rotor,
   selecting an initial turbine vane ring from the subset of standard turbine vane rings included in the initial turbine stage based on the exit corrected flow output of the axial compressor,
   selecting a second turbine stage from the set of standard turbine stages based on a predetermined power demand, wherein the second turbine stage is any turbine stage from the set of standard turbine stages that is greater in size than the selected initial turbine stage,
   selecting a second turbine vane ring from the subset of standard turbine vane rings included in the second turbine stage based on exit conditions of the initial turbine stage, and
   locating the initial turbine vane ring downstream of the axial compressor, locating an initial turbine rotor associated with the initial turbine stage directly downstream of the initial turbine vane ring, locating the second turbine vane ring directly downstream of the initial turbine rotor, and locating a second turbine rotor associated with the second turbine stage directly downstream of the second turbine vane ring to provide a turbine for a gas turbine engine.

2. The method of claim 1, wherein the second turbine stage selected from the set of standard turbine stages is not directly sequential to the selected initial turbine stage.

3. A method of assembling a gas turbine engine, the method comprising:
   providing an axial compressor including a predetermined number of axial compressor stages based on an engine performance capability for the gas turbine engine, the axial compressor having an exit corrected flow output,
   providing a set of standard turbine stages whereby each standard turbine stage includes a single turbine rotor having a plurality of turbine blades configured to rotate about an axis and a subset of standard turbine vane rings associated with the single turbine rotor and including a plurality of turbine vanes, wherein the set of standard turbine stages ranges from a first turbine stage to an $M^{th}$ turbine stage where M is a natural number greater than 1, and wherein each of the subset of standard turbine vane rings ranges from a first turbine vane ring to a $Z^{th}$ turbine vane ring where Z is a natural number greater than 1 and whereby a throat area of the plurality of turbine vanes of each turbine vane ring included in the subset of standard turbine vane rings gradually increases from the first turbine vane ring to the $Z^{th}$ turbine vane ring, selecting an initial turbine stage from the set of standard turbine stages based on the exit corrected flow output of the axial compressor, selecting an initial turbine vane ring from the subset of standard turbine vane rings included in the initial turbine stage based on the exit corrected flow output of the axial compressor, locating the initial turbine vane ring downstream of the axial compressor, and locating an initial turbine rotor associated with the initial turbine stage directly downstream of the initial turbine vane ring to provide a turbine for the gas turbine engine.

4. The method of claim 3, further comprising selecting a second turbine stage from the set of standard turbine stages based on a predetermined power demand of the turbine for the gas turbine engine, wherein the second turbine stage is any turbine stage from the set of standard turbine stages that is greater in size than the selected initial turbine stage, selecting a second turbine vane ring from the subset of standard turbine vane rings included in the second turbine stage based on exit conditions of the initial turbine stage, locating the second turbine vane ring directly downstream of the initial turbine stage, and locating a second turbine rotor associated with the second turbine stage directly downstream of the second turbine vane ring.

5. The method of claim 4, wherein the exit corrected flow output is based on at least a predetermined inlet corrected flow of the axial compressor and a predetermined pressure ratio of the axial compressor included in the engine performance capability.

6. The method of claim 5, wherein the exit corrected flow output is further based on at least a predetermined efficiency of the axial compressor and a predetermined operating temperature of a combustor included in the gas turbine engine.

7. The method of claim 5, wherein providing the axial compressor includes providing a set of standard axial compressor stages that each include a rotor having a plurality of blades configured to rotate about the axis and a stator having a plurality of stator vanes, wherein the set of standard axial compressor stages ranges from a first compressor stage to an $N^{th}$ compressor stage where N is a natural number greater than 1 and whereby a radial length of the plurality of blades and a radial length of the stator vanes on each compressor stage included in the standard compressor stages gradually decreases in size from the first compressor stage to the $N^{th}$ compressor stage, selecting an initial axial compressor stage from the set of standard axial compressor stages for the gas turbine engine based on the predetermined inlet corrected flow, and adding any number of sequential axial compressor stages from the set of standard axial compressor stages downstream of the initial axial compressor stage based on the predetermined pressure ratio.

8. The method of claim 4, wherein the second turbine stage selected from the set of standard turbine stages is not directly sequential to the selected initial turbine stage.

9. The method of claim 4, wherein the second turbine stage selected from the set of standard turbine stages is directly sequential to the selected second turbine stage.

10. The method of claim 3, further comprising selecting any number of turbine stages from the set of standard turbine stages based on a predetermined power demand of the turbine for the gas turbine engine, selecting one turbine vane ring from each subset of standard turbine vane rings included in each of the turbine stages selected from the set of standard turbine stages based on exit conditions of an upstream turbine stage, locating each turbine vane ring downstream of the initial turbine stage, and locating one turbine rotor associated with each of the turbine stages selected from the set of standard turbine stages downstream and between each of the turbine vane ring.

11. The method of claim 10, wherein a furthest downstream turbine stage included in the number of turbine stages is not the $M^{th}$ turbine stage.

12. The method of claim 10, wherein the exit corrected flow output is determined by a predetermined inlet corrected flow of the axial compressor and a predetermined pressure ratio of the axial compressor included in the engine performance capability.

13. A method comprising:

providing a first axial compressor including a first predetermined number of axial compressor stages based on an engine performance capability for a first gas turbine engine, the first axial compressor having a first exit corrected flow output, providing a set of standard turbine stages whereby each standard turbine stage includes a single turbine rotor having a plurality of turbine blades and a subset of standard turbine vane rings associated with the single turbine rotor and including a plurality of turbine vanes, wherein the set of standard turbine stages ranges from a first turbine stage to an $M^{th}$ turbine stage where M is a natural number greater than 1, and wherein each of the subset of standard turbine vane rings ranges from a first turbine vane ring to a $Z^{th}$ turbine vane ring where Z is a natural number greater than 1 and whereby a throat area of the plurality of turbine vanes of each turbine vane ring included in the subset of standard turbine vane rings gradually increases from the first turbine vane ring to the $Z^{th}$ turbine vane ring, selecting an initial turbine stage from the set of standard turbine stages for the first gas turbine engine based on the first exit corrected flow output of the first axial compressor, selecting an initial turbine vane ring from the subset of standard turbine vane rings included in the initial turbine stage for the first gas turbine engine based on the first exit corrected flow output of the first axial compressor of the first gas turbine engine, locating the initial turbine vane ring for the first gas turbine engine downstream of the first axial compressor of the first gas turbine engine and locating an initial turbine rotor associated with the initial turbine stage for the first gas turbine engine directly downstream of the initial turbine vane ring of the first gas turbine engine to provide a turbine for the first gas turbine engine, providing a second axial compressor including a second predetermined number of axial compressor stages based on an engine performance capability for a second gas turbine engine, the second axial compressor having a second exit corrected flow output, selecting an initial turbine stage from the set of standard turbine stages for the second gas turbine engine based on the second exit corrected flow output of the second axial compressor, selecting an initial turbine vane ring from the subset of standard turbine vane rings included in the initial turbine stage for the second gas turbine engine based on the second exit corrected flow output of the second axial compressor, and locating the initial turbine vane ring for the second gas turbine engine downstream of the second axial compressor of the second gas turbine engine and locating an initial turbine rotor associated with the initial turbine stage for the second gas turbine engine directly downstream of the initial turbine vane ring of the second gas turbine engine to provide a turbine for the second gas turbine engine.

14. The method of claim 13, further comprising selecting a second turbine stage from the set of standard turbine stages based on a first predetermined power demand of the turbine for the first gas turbine engine, wherein the second turbine stage is any turbine stage from the set of standard turbine stages that is greater in size than the selected initial turbine stage for the first gas turbine engine, selecting a second turbine vane ring from the subset of standard turbine vane rings included in the second turbine stage for the first gas turbine engine based on exit conditions of the initial turbine stage of the turbine for the first gas turbine engine, locating the second turbine vane ring downstream of the initial turbine stage in the first gas turbine engine, and locating a second turbine rotor associated with the second turbine stage downstream of the second turbine vane ring in the first gas turbine engine.

15. The method of claim 14, further comprising selecting any number of turbine stages from the set of standard turbine stages based on the first predetermined power demand of the turbine of the first gas turbine engine, selecting one turbine vane ring from each subset of standard turbine vane rings included in each of the turbine stages selected from the set of standard turbine stages based on the exit conditions of an upstream turbine stage in the first gas turbine engine, locating each turbine vane ring downstream of the initial turbine stage of the first gas turbine engine, and locating one turbine rotor associated with each of the turbine stages selected from the set of standard turbine stages downstream and between each of the turbine vane rings added to the first gas turbine engine.

16. The method of claim 15, further comprising selecting any number of turbine stages from the set of standard turbine stages based on a second predetermined power demand of the turbine for the second gas turbine engine that is different than the first predetermined power demand of the turbine of the first gas turbine engine, selecting one turbine vane ring from each subset of standard turbine vane rings included in each of the turbine stages selected from the set of standard turbine stages based on the exit conditions of an upstream turbine stage in the second gas turbine engine, locating each turbine vane ring downstream of the initial turbine stage of the second gas turbine engine, and locating one turbine rotor associated with each of the turbine stages selected from the set of standard turbine stages downstream and between each of the turbine vane rings added to the second gas turbine engine.

17. The method of claim 16, wherein the number of turbine stages for the second gas turbine engine is different from the number of turbine stages for the first gas turbine engine.

18. The method of claim 14, wherein the first exit corrected flow output is determined by a first predetermined inlet corrected flow of the first axial compressor and a first predetermined pressure ratio of the first axial compressor included in the engine performance capability for the first gas turbine engine.

19. The method of claim 18, wherein the second exit corrected flow output is determined by a second predetermined inlet corrected flow of the second axial compressor and a second predetermined pressure ratio of the second axial compressor included in the engine performance capability for the second gas turbine engine.

20. The method of claim 14, wherein the second turbine stage selected from the set of standard turbine stages is not directly sequential to the selected initial turbine stage for the first gas turbine engine.

* * * * *